(No Model.)

P. H. JACKSON.

FLOOR OR AREA COVERING.

No. 314,677.  Patented Mar. 31, 1885.

Witnesses,
Geo. H. Strong.

Inventor,
P. H. Jackson
By Dewey & Co.
Attorneys (No Model.) 2 Sheets—Sheet 2.

P. H. JACKSON.
FLOOR OR AREA COVERING.

No. 314,677. Patented Mar. 31, 1885.

Witnesses,
Geo. H. Strong.

Inventor,
P. H. Jackson
By Dewey & Co.
Attorneys

UNITED STATES PATENT OFFICE.

PETER H. JACKSON, OF SAN FRANCISCO, CALIFORNIA.

FLOOR OR AREA-COVERING.

SPECIFICATION forming part of Letters Patent No. 314,677, dated March 31, 1885.

Application filed December 1, 1884. (No model.)

*To all whom it may concern:*

Be it known that I, PETER H. JACKSON, of the city and county of San Francisco, State of California, have invented an Improvement in Floors or Area-Coverings; and I hereby declare the following to be a full, clear, and exact description of the same.

My invention relates to certain improvements in fire-proof floors, pavements, or area-coverings; and it consists of a surface of artificial stone or concrete, either with or without illuminating-tiles set therein, together with corrugated metal plates, strengthening bars, or ridges in connection with said plates, and metallic ties for the same, together with certain details of construction, all of which will be more fully explained by reference to the accompanying drawings, in which—

Figure 1:
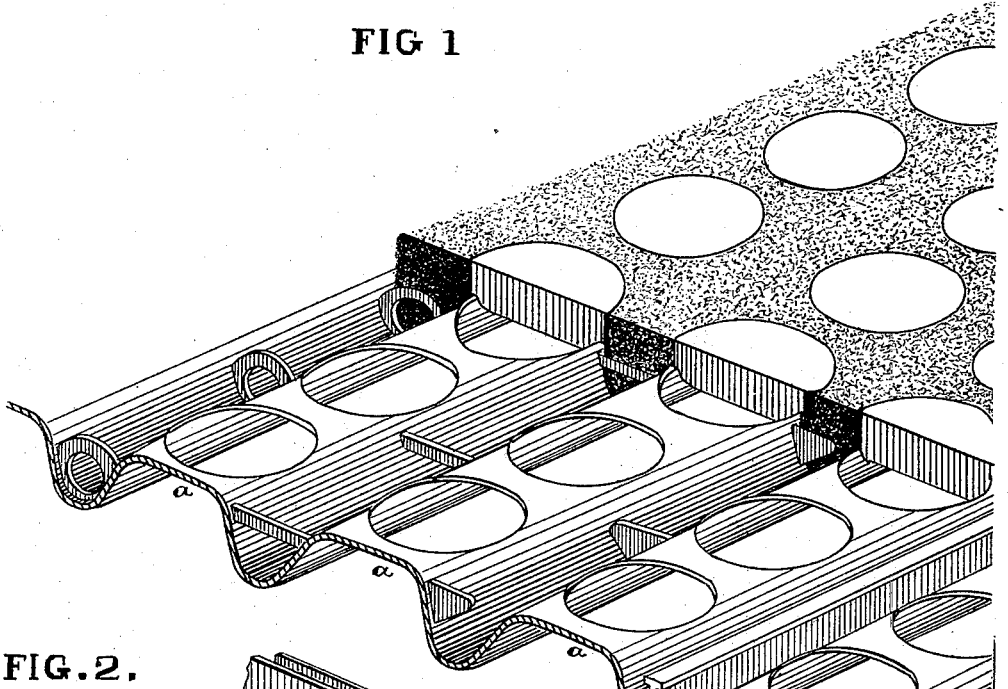
Figure 2:
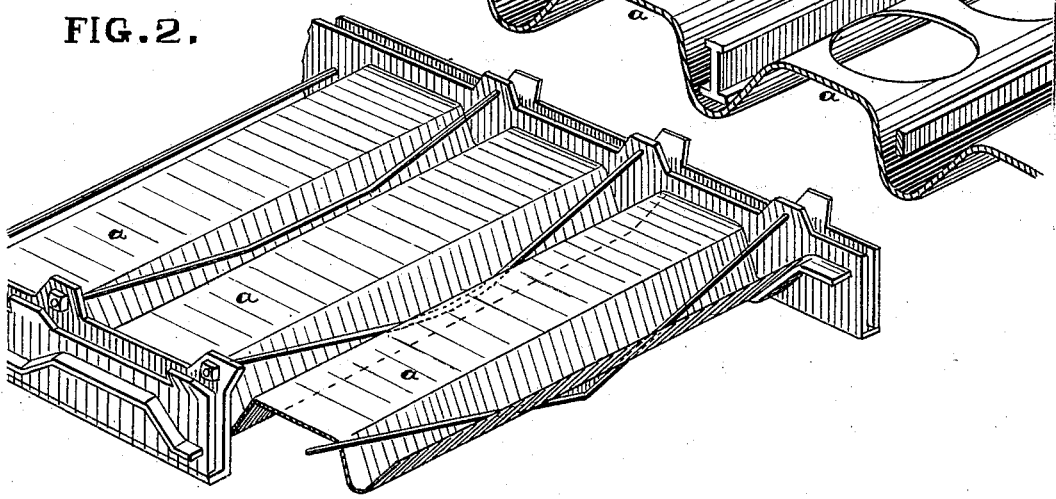
Figure 3:
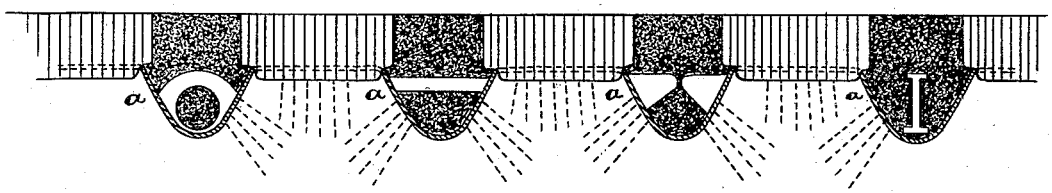
Figure 4:
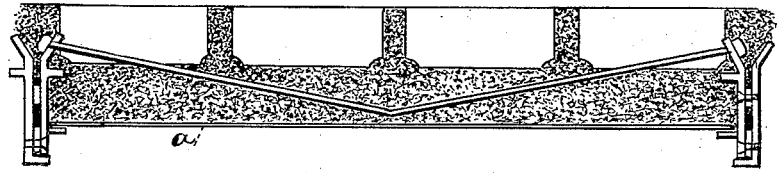
Figure 5:
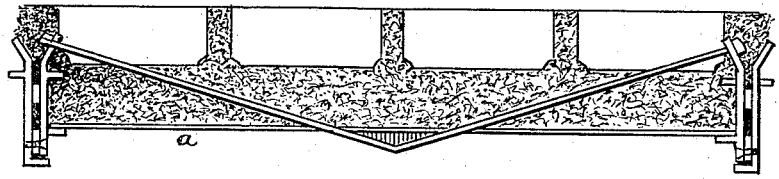

Figure 1 is a perspective view of my floor or covering. Fig. 2 is a view showing one form of strengthening ribs or ties. Fig. 3 is section taken transversely to the corrugations, and showing one form of strengthening-rib. Figs. 4 and 5 are sections taken through the axis lengthwise of the corrugations, showing the inclined strengthening-rods.

In my present construction I employ corrugated iron plates $a$, formed in sections which are suitably supported at the ends, and when it is necessary to illuminate the space below bull's-eye or other thick glass may be fixed in suitable openings formed in the ridges or upwardly-curved portions of the plates. Above this corrugated iron and around the glasses, when they are used, I fill Portland cement, concrete, or other suitable material, which will form a surface upon which passers may walk, while the under surface of the corrugated iron and the glass forms a ceiling to the apartment beneath.

If desired, that portion of the corrugated plates which extends upwardly may be whitened, painted, or otherwise coated, so as to form a reflecting-surface by which light will be better diffused within the apartment.

In some cases I form the corrugated plates with transverse bars extending from side to side of each corrugation, or with vertical plates extending across in a similar manner, and having holes through them, or with projections which may extend into each side of the corrugations, as shown in Figs. 1 and 3, so that when the cement is filled in from above it enters the depressed portions of the corrugated plates and fills in around these plates and bars and projections, so as to form a solid union or bond, which will prevent the cement from being loosened from the iron. These projections also serve to strengthen the plates as well as to unite it with the concrete.

In some cases I employ beams or bars which lie in the grooves formed by the downward curve of the corrugated plates. These bars being either extended along the grooves without fastening to the plate, or, if desired, they may be attached to the lower portion of the plates, and the concrete will be filled in around them, as before described.

Figs. 2, 4, and 5 show still another method of strengthening these corrugated sections by the use of metallic ties which may extend either longitudinally through the depressions formed by the downward grooves of the corrugated plates, or they may be bent downward in the center, the ends rising, as shown in Figs. 4 and 5. These bars may be secured or not at intervals to the bottom of the corrugated plates, and their ends may pass through bearers or supports where they can be tensilely strained by nuts upon their outer ends, or by other means. In connection with this construction of corrugated plates I employ metallic bearers, which consist of deep vertical ribs having horizontally-projecting ledges or shoulders. These ribs may fit against the corresponding ones of the next bearers of the adjacent section, to which they may be bolted when in place, as shown in Fig. 2. The shoulders of these bearers follow the outline of the corrugations or ends of the plates, so that the latter may rest upon them, and the metal is thus strengthened in a direction at right angles with the corrugations. These metallic bearers may be connected with the direct metallic ties, as shown in Figs. 2, 4, 5. These ties extend from one bearer to the next and are secured to them as shown, thus holding the bearers rigidly in position, and when the whole is filled in with the plastic material with ties extending through the corrugated plates, it forms a net-work which secures the whole of the parts at their relative distances from each other, and it is very solid in resisting deflection. Ribs may be formed between these half-bearers which I have described to keep those which are adjacent to each other a certain distance apart to admit of the introduction of cement between them, which will make a water-tight joint to the full depth of bearer.

Having thus described my invention, what I claim as new, and desire to secure by Letters Patent, is—

1. In a sidewalk or floor, metallic supporting-beams with transverse arched or corrugated plates, in combination with a superposed surface or sidewalk composed of cement, artificial stone, or concrete, substantially as herein described.

2. In a sidewalk, area-covering, or floor, metallic supporting-beams with transverse corrugated plates to support a sidewalk or surface of concrete, in combination with bars or bearers extending longitudinally within the corrugations, substantially as herein described.

3. In a sidewalk, area-covering, or floor, metallic supporting-beams with corrugated iron plates extending between them, and having the upwardly-curved arched portions perforated to receive illuminating-glasses, in combination with a filling between the glasses of concrete or artificial stone which is supported by the plates and fixed to the floor or surface, substantially as herein described.

4. In a sidewalk, area-covering, or floor, corrugated or iron or other metal plates for the reception of a surface of concrete or artificial stone, in combination with metallic projections or bars formed in the depressions or grooves of the corrugated metal, substantially as herein described.

5. In a sidewalk, area covering, or floor, metallic beams with corrugated iron plates supported between them and a filling of concrete or other plastic material above the plates, in combination with metallic ties extending longitudinally through the corrugations secured at the ends, substantially as herein described.

6. In combination with the corrugated plates, bearers consisting of vertical plates or bars secured at the ends of each section, and having projecting ribs or flanges curved to correspond with the depressions and elevations in the corrugated plates, and upon which the ends of the plates rest and are supported, substantially as herein described.

7. Corrugated metallic plates and bearers having correspondingly-curved projecting ribs upon which the plates are supported, together with lugs or projections between the adjacent ribs to form a space for the introduction of a water-tight cement, substantially as herein described.

8. In a sidewalk, area-covering, or floor, corrugated iron plates having the upwardly-curved arched portions perforated to receive illuminating-glasses, in combination with a filling between the glasses of concrete or artificial stone which is supported by the plates, and with metallic bearers consisting of vertical plates or bars on which the ends of each of them rest, and having projecting ribs or flanges curved to correspond with the depressions and elevations in the corrugated plates, substantially as herein described.

In witness whereof I have hereunto set my hand.

PETER H. JACKSON.

Witnesses:
LINCOLN SONNTAG,
CHAS. SONNTAG.